Figure 8:
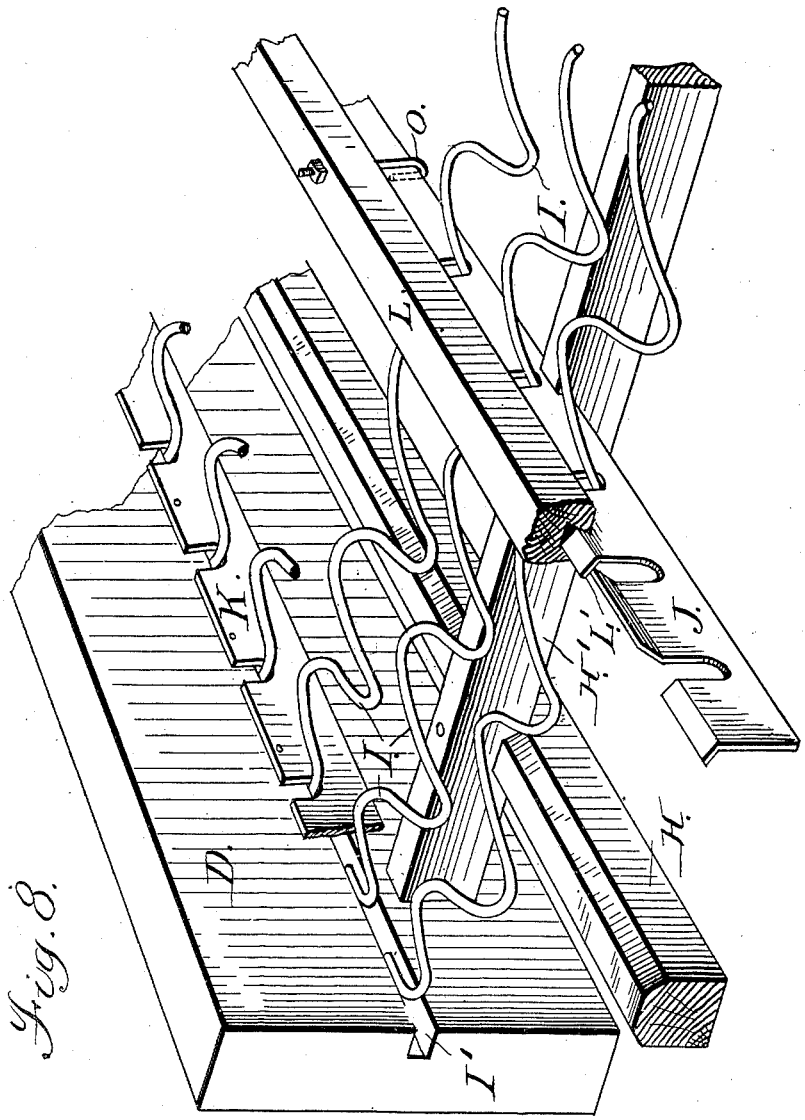

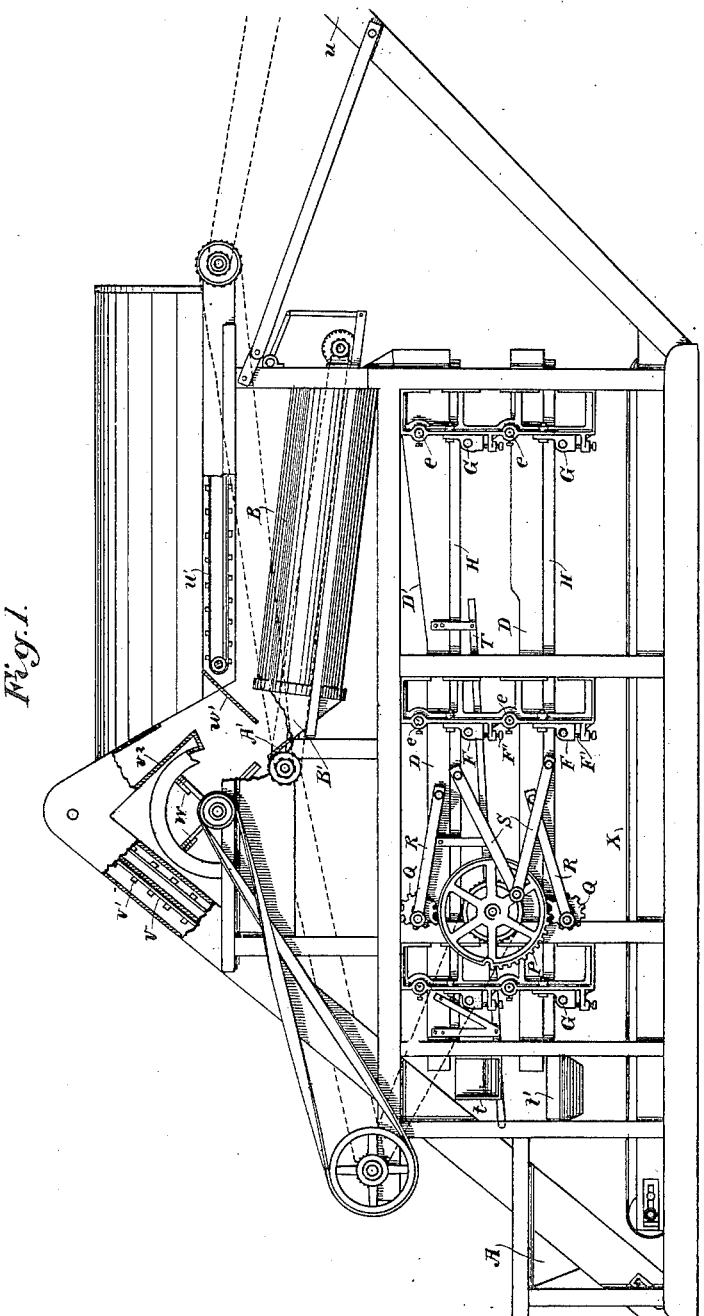

No. 659,801. Patented Oct. 16, 1900.
W. G. READ.
ALMOND HULLER AND SEPARATOR.
(Application filed July 17, 1899.)
(No Model.) 3 Sheets—Sheet 2.
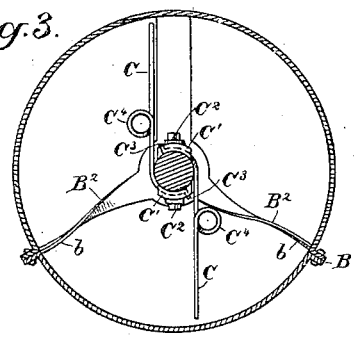
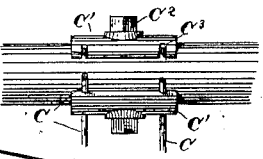
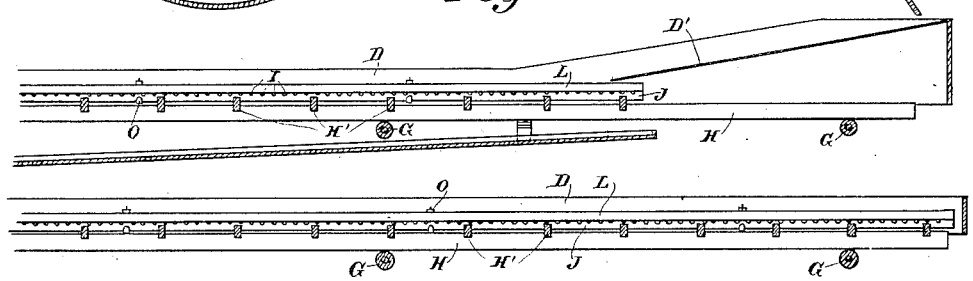
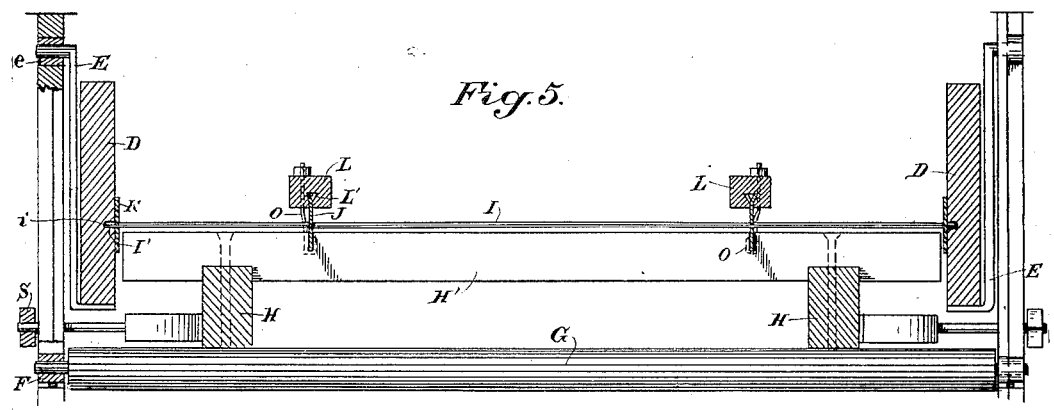
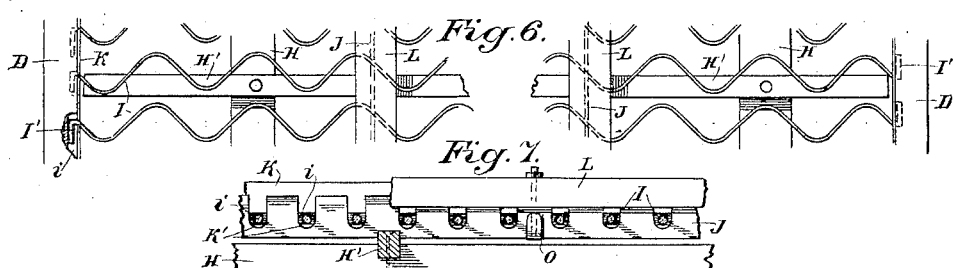
Witnesses,
Inventor,
Walter G. Read
By Dewey Strong & Co.
Attys
THE NORRIS PETERS CO., PHOTO-LITHO., WASHINGTON, D. C.

No. 659,801. Patented Oct. 16, 1900.
W. G. READ.
ALMOND HULLER AND SEPARATOR.
(Application filed July 17, 1899.)
(No Model.) 3 Sheets—Sheet 3.

WITNESSES
Chapman W. Fowler
Howell Bartle

INVENTOR
Walter G. Read
by Dewey Strong & Co
his Attorneys

UNITED STATES PATENT OFFICE.

WALTER G. READ, OF COLUSA, CALIFORNIA.

ALMOND HULLER AND SEPARATOR.

SPECIFICATION forming part of Letters Patent No. 659,801, dated October 16, 1900.

Application filed July 17, 1899. Serial No. 724,167. (No model.)

*To all whom it may concern:*

Be it known that I, WALTER G. READ, a citizen of the United States, residing at Colusa, in the county of Colusa, State of California, have invented an Improvement in Almond Hullers and Separators; and I hereby declare the following to be a full, clear, and exact description of the same.

My invention relates to an apparatus for removing the hulls from almonds and separating the hulled nuts from the unhulled nuts, hulls, leaves, sticks, &c., and the unhulled nuts from the hulls, leaves, sticks, &c., delivering the clean hulled nuts into a receptacle, the unhulled nuts into another receptacle, and the separated hulls, leaves, sticks, &c., into another receptacle at the rear of the machine.

The invention consists of the parts and the constructions and combinations of parts hereinafter described and claimed.

Figure 1 is a side elevation of the machine. Fig. 2 is a longitudinal section through the screen portions of the machine. Fig. 3 is a lateral section through the cylinder. Fig. 4 shows the manner of clamping the beaters to the shaft. Fig. 5 is a cross-section through one of the shoes. Fig. 6 is a plan view of the same. Fig. 7 is a detail longitudinal section through the shoe. Fig. 8 is an enlarged detail in perspective of a portion of the screen-surface, showing the channels for the outer ends thereof and the side and intermediate spacing-plates.

My present invention is designed to cover improvements upon Patent No. 613,867, issued to me November 8, 1898. The general arrangement of the frame with the feed-hopper, fan, cylindrical drum, and receiving-screen is similar in appearance to a constrution shown in my former patent.

A is the receiving-hopper, into which are placed the almonds, leaves, sticks, &c., as they may be gathered from the orchard. An inclined elevator-belt $v$ is provided with slats $v'$, which carry the nuts, &c., from the hopper up to the upper end, where they fall upon an inclined chute or bottom $v^2$ and are directed by this into the throat B' of the cylinder B. A blast of wind from the fan $w$ is directed up through the passage by which the nuts fall upon the chute A', and the leaves, sticks, and light material are struck by this wind-blast, which passes over an inclined wind-board $w'$, and are blown up onto the slatted draper-carrier $u'$, from the rear end of which they fall upon the inclined portion of a final tailings-discharge draper $u$. The nuts pass into the cylinder, drum, or casing B, which is mounted upon the adjustable longitudinally-inclined axis, as shown. The shell of the cylinder is made in two parts, as shown at $B^3$, and it is supported upon the radial arms or spiders $B^2$ at the ends, the longitudinal shaft passing through the center of the spiders. By having one side removable access to the interior is easy when necessary. The blades $B^2$ serve as braces or arms and extend to the periphery of the cylinder. They are preferably flat; but if they had the same position at the rim as they have at the center of the cylinder they would retard the passage of the almonds into and out of the cylinder. Therefore the arms $B^2$ at the receiving end are shown twisted so as to present their edges only to the nuts at the portions near the rim of the cylinder, thereby reducing the surface as much as possible and allowing more freedom for the passage of the almonds. Within the cylinder the nuts are subjected to the action of beaters, which are plainly shown at C, these beaters revolving in the cylinder so as to strike the nuts therein and loosen the hulls from the nuts. These beaters are made, as shown, of elastic wires, which are partially coiled around the central shaft and are secured by means of segmental clamping-plates C', which are curved to fit the cylindrical shaft and have grooves or channels made inside to fit over the wires, and they are secured upon the shafts by bolts $C^2$. The wires curving under these clamps have the ends turned sharply outward, as shown at $C^3$, and these upwardly-turned ends fit into notches made in the edges of the clamps, which serve to hold them solidly in place, but allow them to be easily removed when desired. In order to give these arms C the requisite elasticity, I have shown them made with turns between the shaft and the outer ends, as shown at $C^4$, and these coils greatly increase the elasticity and effective work of the beaters. From the discharge end of the cylinder the nuts, hulls, and other substances which may be mixed with them are delivered by a chute upon the rear end of a screen which is carried in a shoe D. The rear portion of the screen is made with a perforated metal plate, as shown at D', and the small hulls, broken hulls, hulled almonds, and finer dirt fall through these holes upon a screen below. The large hulls and unhulled almonds pass over the perforated plate and onto the separating-wires forming the other portion of this screen.

In the present case I have shown two shoes carrying screens, and they are so suspended that an oscillating or shaking motion is given them by mechanism hereinafter described, so as to thoroughly agitate the nuts and material that fall upon them and to induce the proper separation.

The shoes D are hung in brackets on the main frame by means of hangers E, which are swiveled to the brackets, as shown. The hangers are in the form of rocker-arms, and the ends extend through wooden bushings e, which are fitted into the holes in the brackets, so as to form bearings in which the rocker-arms oscillate, and this forms a very effective antifrictional and non-wearing bearing. The brackets have vertically-adjustable journal-boxes connected with them, as shown at F, and these are movable up and down by means of screws F'. In these boxes are journaled transversely-disposed rollers G, and upon these rollers rests a frame consisting of longitudinal bars H, having cross-bars H', which are adapted to move closely against the bottom of the wires forming the screen-surfaces which are carried in the shoe D. This portion of the screen is made of wires curved, essentially, into semicircular forms in opposite directions, thus forming a wavy outline from one side to the other of the screen. The ends of these wires I are bent at right angles, as shown at I', and they fit into grooves or channels i, made longitudinally in the sides of the shoe, and this retains the wires with their arcs of curvature always in the plane of the shoe and of each other. The wires being curved in this manner form semicircular channels between them, which are of the size and shape similar to that of the hulls of the nuts, and this allows the latter to shake down through these narrow channels, the width of which is not sufficient to allow the full-sized almonds to pass through.

I have shown plates K fixed upon the sides of a shoe, these plates having notches or grooves made in them, as shown at K', into which the wires fit, so that the plates are secured in the sides of the shoe. Each wire lies in grooves or channels at opposite sides of the screen-frame, and the ends are thus maintained at an equal distance apart, while, as before described, the bent ends I' prevent the wires from turning. Similar channeled spacing-plates J are supported beneath the central portion of the wires, so that they are prevented from springing and becoming too widely separated at a point intermediate between their end supports. The bars H' of the frames H, previously described, lying close beneath the bottoms of these wire-screens the oscillating motion given the parts will act to pull through any of the hulls which may be inclined to stick in the screens, which keeps the screens clear at all times.

The central spacing-plates J have their upwardly-projecting edges between the slots K' set alternately to one side in the manner of setting saw-teeth, and these edges extend into a dovetailed groove L', made longitudinally in the lower part of the bar L, so that when this dovetailed groove is slid over these divergent edges of the plates J the plate will be locked and held in position. In addition to this I have shown hook-bolts O, of which the curved or hook ends are clasped over the lower edges of the plates, and the bolts extend up through the bars L and have nuts upon the upper ends by which they are firmly secured and locked in place.

In order to oscillate the screen and its rubber alternately with relation to each other, I have shown a mutilated gear journaled upon the frame and rotated by any suitable connection. Parallel with the gear-shaft are other shafts having mutilated pinions Q fixed upon them, and from these pinions pitmen R extend to the sides of the screen-frames D, so that when the teeth in the mutilated gear P arrive at the point where they engage with either pinion the pinion will be rotated a single full revolution, and the pitmen R being connected by eccentrics or crank-pins the screen will thus be given a single reciprocation in each direction, and when the teeth of the mutilated gear have passed the pinion the latter remains stationary until the gear-teeth again reach it. The rubbing-bar supports H', situated below the rubbing-bars, situated below the screen, are in like manner oscillated by means of pitmen S, connected with crank-pins upon the mutilated gear-wheel and upon the opposite end of its shaft, and these are so set with relation to the teeth of the gear that when the teeth of the gear engage the pinions of the screens, either the upper or the lower one, the crank-pins of the rubber-frame will be passing the center, and the rubber will at this time be approximately stationary, while the screen-frame receives its double reciprocation and oscillation. Then when the gear-teeth have become disengaged from the pinions and the screen-frame remains stationary the cranks of the rubbing-frames will be passing through their arc of travel and the rubbers will be in motion. Thus the screen-frames are each given a forward and back movement or double reciprocation. Then they remain stationary and the rubbing-frames are moved forward and back beneath them. Then the rubbing-frames again remain stationary while the screen-frames receive their movement, the movement being thus alternated. As the unhulled nuts and large hulls are worked forward by the oscillating motion of the shoe the hulls will be separated from the unhulled nuts, as previously described, and fall into a pan T, which extends beneath the wire-screen portion, and these are discharged from the pan (which is secured to the shoe sides and has the same oscillating motion) onto the forward end of the tailings-discharge draper, the unhulled nuts being delivered at the front end of the shoe by a spout $t$ into boxes. The hulled nuts, small hulls, broken pieces, &c., which fall through the perforated metal plate onto the rear end of the lower screen are worked forward by the oscillating motion of the shoe and the hulled nuts delivered by a spout $t'$ at the front end of a shoe into boxes on the opposite side of the machine, from where the unhulled nuts are delivered, the hulls, broken pieces, &c., working through the separating-wires and falling upon the tailings-discharge draper X. The spaces between the separating-wires in the upper shoe are wider than those in the lower shoe, so that the large hulls coming upon them will pass through more readily. The spaces between the wires in the lower shoe are narrower, so that the hulled nuts will be supported by the wires.

Having thus described my invention, what I claim as new, and desire to secure by Letters Patent, is—

1. In an almond hulling and separating machine, the combination of a cylinder or drum, a longitudinally-journaled rotary shaft extending therethrough, means for delivering unhulled almonds into the drum, beater-arms fixed upon the shaft within the drum, and radial braces or arms fixed in the receiving end of the drum and having their outer ends twisted or turned to present their edges toward the nuts whereby the feed of the nuts into and through the drum is facilitated.

2. In an almond hulling and separating machine, a suspended shoe and means for oscillating the same, a screen-surface composed of wires extending transversely of the shoe and bent alternately in opposite directions to form wavy outlines of approximately the curvature of the almond-hulls, said wires having their ends bent at an angle and fitted in grooves or channels in the inner faces of the shoe, and end and intermediate plates having grooves or channels for the wires whereby the latter are spaced and held.

3. In an almond hulling and separating machine, a suspended oscillating shoe, a screen-surface formed of wires extending transversely and segmentally curved in opposite directions, grooves or channels formed in the inner faces of the shoe sides, angular bends made in the ends of the wires adapted to fit in said grooves whereby the wires are held with their plane of curvature in a common plane longitudinally of the screen, rubbing-frames below and parallel with relation to the screens and means whereby the rubbing-frames are reciprocated alternately with the reciprocation of the screens.

4. In an almond hulling and separating machine, a suspended oscillating shoe, a screen-surface composed of wires bent alternately in opposite directions to form segmental or wavy outlines of approximately the curvature of the almond-hulls, the ends of said wires being bent at right angles and fitted in longitudinal grooves or channels in the inner faces of the shoe side, whereby the plane of curvature of the wires is maintained in a common longitudinal plane from end to end of the shoe, spacing-plates fixed to the sides of the shoe within which the wires fit by which the distances between them are maintained, and similar spacing-plates clasping the intermediate portions of the wires between the sides of the shoe.

5. In an almond hulling and separating machine, a suspended oscillating shoe, a screen-bottom formed of wires having wavy curved outlines from side to side, means by which the said wires are maintained with their plane of curvature in a common plane longitudinally of the screen, spacing-plates fixed upon the side of the shoe in which the ends of the wire lie, other spacing-plates intermediate between the sides of the shoe having the upper edges between the slots set alternately in opposite directions in the manner of saw-teeth, bars extending longitudinally above the wire screens having dovetailed grooves in the lower faces in which said divergent edges of the spacing-plates fit, hook-bolts extending through the bars clasping the lower edges of the plates and nuts by which they are secured to the bars.

6. In an almond hulling and separating machine, a main frame, brackets secured upon opposite sides, hangers having one end journaled in the brackets, a shoe having separating-screens fixed therein and suspended from said brackets, journal-boxes adjustably connected with the brackets, rollers journaled in said boxes extending transversely across beneath the screen-shoe, a rubbing-frame, of longitudinal and transverse bars mounted upon said rollers and adjustable vertically therewith beneath the screen-frame, and means by which the screen and rubbing-frames are oscillated, independently and the rubbing-frame oscillated alternately with the reciprocation of the screens.

7. In an almond hulling and separating machine, a suspended shoe having a screen fixed therein, means for delivering the nuts to be separated upon the screen, means for oscillating the screen, consisting of a pinion-shaft, crank-pins, pitmen connecting said crank-pins with the screen-frame and a revoluble mutilated gear, the teeth of which engage the teeth of the pinion once during each revolution, whereby the pinion is given a single revolution and the shoe a double reciprocation.

8. In an almond hulling and separating machine, suspended shoes having separating-screens fixed therein, crank-shafts, pitmen connecting the shafts with the screens, pinions mounted upon the crank-shafts and a mutilated gear, the teeth of which are adapted to engage the pinions once during each revolution of the gear whereby the screens are given a double reciprocation, rubbing-frames supported and movable beneath the screens, cranks upon the gear-shaft, and pitmen connecting said cranks with the rubbing-shoe.

9. In an almond hulling and separating machine, one or more suspended shoes with screens therein, rubbing-frames below and parallel with relation to said screens, mechanism by which the screens are independently and intermittently moved forward and back, mechanism by which the rubbing-shoes are intermittently reciprocated alternately with the reciprocation of the screens, a receiving-pan beneath the screens into which the separate hulls are delivered and means by which the hulls are carried away from the receiving-pan, and a discharge by which the nuts remaining upon the screens are delivered therefrom.

In witness whereof I have hereunto set my hand.

WALTER G. READ.

Witnesses:
W. S. GREEN,
WES. K. DE JARNETT.